United States Patent
Viger et al.

(10) Patent No.: US 8,169,911 B2
(45) Date of Patent: May 1, 2012

(54) METHOD FOR TRANSMITTING A DATA STREAM WITH ANTICIPATION OF ACKNOWLEDGMENTS, CORRESPONDENCE INPUT DEVICE AND COMPUTER-READABLE STORAGE MEDIUM

(75) Inventors: Pascal Viger, Marie Curie (FR); Stéphane Baron, Le Rheu (FR)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 12/356,516

(22) Filed: Jan. 20, 2009

(65) Prior Publication Data

US 2009/0213850 A1 Aug. 27, 2009

(30) Foreign Application Priority Data

Jan. 30, 2008 (FR) ...................................... 08 50561

(51) Int. Cl.
*H04J 1/16* (2006.01)
(52) U.S. Cl. ...................................................... 370/235
(58) Field of Classification Search .................. 370/235, 370/236
See application file for complete search history.

(56) References Cited

U.S. PATENT DOCUMENTS

| | | | | |
|---|---|---|---|---|
| 5,557,662 | A * | 9/1996 | Kenmochi et al. | 379/100.01 |
| 6,701,370 | B1 * | 3/2004 | Dillon | 709/230 |
| 7,116,988 | B2 * | 10/2006 | Dietrich et al. | 455/456.1 |
| RE39,990 | E * | 1/2008 | Shalem et al. | 455/445 |
| 7,606,213 | B2 * | 10/2009 | Mishra et al. | 370/349 |
| 7,656,799 | B2 * | 2/2010 | Samuels et al. | 370/231 |
| 2003/0149715 | A1 * | 8/2003 | Ruutu et al. | 709/100 |
| 2004/0184478 | A1 | 9/2004 | Donescu | |
| 2005/0044146 | A1 | 2/2005 | Nassor | |
| 2005/0044483 | A1 | 2/2005 | Maze | |
| 2005/0060426 | A1 | 3/2005 | Samuels | |
| 2005/0198118 | A1 | 9/2005 | Viger | |
| 2005/0228753 | A1 | 10/2005 | Viger | |
| 2006/0271688 | A1 | 11/2006 | Viger | |
| 2007/0288743 | A1 * | 12/2007 | Cam-Winget et al. | 713/150 |
| 2008/0065944 | A1 * | 3/2008 | Seol et al. | 714/748 |
| 2008/0307439 | A1 * | 12/2008 | Basso et al. | 719/318 |
| 2009/0034416 | A1 | 2/2009 | Baron | |
| 2009/0219805 | A1 * | 9/2009 | Appanna et al. | 370/219 |
| 2009/0279429 | A1 * | 11/2009 | Griffoul | 370/230 |
| 2010/0067481 | A1 * | 3/2010 | Maeda | 370/331 |

OTHER PUBLICATIONS

French Search Report dated Sep. 16, 2008 issued during prosecution of related French application No. 08/50561.

* cited by examiner

*Primary Examiner* — Chirag Shah
*Assistant Examiner* — Jay P Patel
(74) *Attorney, Agent, or Firm* — Fitzpatrick, Cella, Harper & Scinto

(57) ABSTRACT

Data of a stream to be stimulated is transmitted from a sender device to a receiver device through a network segment. An input device of the network segment determines a starting packet in transit (packets transmitted but not yet acknowledged by the receiver device), selects, as a function of a consumption of a target bandwidth for the stream, packets of the stream following the starting packet, temporarily stores selected packets received from the sender device, transmits to the sender device an anticipated positive acknowledgement message for each selected packet on behalf of the receiver device, transmits the selected packets to the receiver device, and discards stored selected packets corresponding to positive acknowledgements of transmitted selected packets.

20 Claims, 7 Drawing Sheets

METHOD FOR TRANSMITTING A DATA STREAM WITH ANTICIPATION OF ACKNOWLEDGMENTS, CORRESPONDENCE INPUT DEVICE AND COMPUTER-READABLE STORAGE MEDIUM

1. FIELD OF THE INVENTION

The field of the invention is that of communications networks.

More specifically, the invention relates to a technique for the transmission of data packets (also called datagrams) according to a first transport protocol, with acknowledgement (each data packet being associated with the sequence number), itself being capable of being transported (or encapsulated) via a segment of a communications network according to a second transport protocol, with or without acknowledgement.

The invention can be applied especially but not exclusively when the network segment is a tunnel going through a communications network.

The democratization of high-bit-rate Internet on the one hand and the appearance of widespread consumer audiovisual equipment having network connectivity on the other hand is going to create new forms of user behavior. These new forms of behavior will undoubtedly involve the emergence of individuals belonging to common-interest groups (i.e. common interests such as leisure, family, etc) that we might call "permanently linked" groups. These groups will set up almost permanent connections with other individuals of a same field of interest, setting up audio and/or video communications and sharing all kinds of information (audio, video, photo, text etc).

The technology of Virtual Private Networks (VPN) is offering a worthwhile solution to this expectation. This technology enables real-time transparent communication in a secure way between individuals who share a same field of interest while at the same time using the Internet infrastructure which has low reliability but is inexpensive.

To communicate transparently and overcome the need for non-routable addresses, VPNs use a particular type of encapsulation known as tunneling which creates what is called a tunnel. This operation consists in encapsulating an A-level protocol (an embedded or conveyed or passenger protocol) in a B-level protocol (transport protocol) by means of an encapsulation protocol C. Thus, the transport protocol processes the passenger protocol as if it is were payload data.

FIG. 3, described in detail here below, presents an example of an encapsulation of packets in a level-2 VPN, i.e. in a level-2 tunnel (a level-2 tunnel means that the passenger protocol is a protocol of the layer 2 of the ISO model which describes the services offered by each of these layers and their interactions).

Tunneling can be used to transport a network protocol on a network that does not support it. It can also be used to provide different types of VPN functions such as for example private addressing.

Tunneling techniques are now increasingly used by functions entailing remote client access and home local area networks (LANs).

Here below in the description, we consider, by way of an example, solely level-2 or level-3 tunnels for which the level of the transport layer B in the OSI model is equal to that of the transport layer (level-4 transport layer in the ISO model). It is clear that the context of the present invention is in no way exhaustive and that the level of the transport protocol B in the OSI model may be lower (in the case of a panel with Ethernet carrier) or higher (in the case of a time and with HTTP carrier).

VPNs are frequently used to interconnect two LANs in order to create a virtual local area network formed by the union of two original LANs. Secured VPNs include a cryptography and authentication algorithm to guarantee the secrecy of the transported data. A typical VPN configuration based on a tunneling technique is illustrated in FIG. 1a (described in detail here below). In this example, the tunnel end-points are not integrated into the gateways. The tunnel is set up between two tunnel end-points and each packet (also called a frame) sent to an apparatus connected to the remote LAN is encapsulated by the local tunnel end-point and then sent to the remote tunnel end-point which will de-encapsulate it and send it on the remote LAN. For the apparatuses, they are virtually connected to a same LAN. A communication between two apparatuses through the tunnel is called end-to-end communication.

VPNs are emerging today based on techniques involving multiple connections, i.e. with one tunnel formed by several carriers or channels. This technique enables the choice of a first transport protocol, for example for control data and a second transport protocol, for example for the payload data, both types of data going through the same tunnel end-point. There are many other possibilities as regards choice of the transport protocol for the passenger applications streams (for example depending on the priorities of the passenger streams etc). The term used then is "virtual channel" of a tunnel formed by numerous physical channels having their own transport protocols, it being known that only the tunnel end-point has knowledge of these physical channels. The choice of the transport protocol can therefore be optimized on each of the two channels.

In the prior art, it is chiefly the IP or Internet protocol (layer 3) or the TCP (transmission control protocol)/UDP (user datagram protocol) (layer 4) that is used. Since IP-based tunneling technologies cannot take account of the network address translation (NAT) mechanism and since they are not entirely compatible with the typical tunneling configuration of FIG. 1, the rest of the description here below considers (solely as examples) solutions based on the layer-4 (transport layer) i.e. on the TCP or the UDP.

As explained in the Appendix which presents the principles of operation of the TCP protocol, the TCP protocol (defined by the IETF standard RFC793) is an ARQ (Automatic Repeat Request or burst transmission protocol) type of protocol that is based on congestion control and retransmission mechanisms, and thus ensures delivery of each packet to its destination.

The UDP protocol is a far simpler and faster protocol that does not take account of the order of the frames and does not hamper acknowledgment.

As specified here above, the TCP protocol was designed to be flexible and work in a wide range of network communications environments including slow and fast links, with high latency, or links with variable error rates. Although the TCP protocol works for different environments, these performance levels (especially the bandwidth) are affected by the characteristics of each communications link used. The performance of the TCP protocol in terms of bandwidth suffers in environments that have lengthy routing times and/or possess a high error rate.

An advanced proxy concept (or PEP (proxy enhanced protocol)) type of concept based on the RFC 3135 standard can be used in infrastructures that suffer from characteristics specific to the communications links crossed. The RFC 3135 standard describes different types of PEP systems embedded in network equipments on the routing path of a TC stream between a server and a client. As shall be described here below, PEP systems are customized for each environment in order to act on the TCP stream congestion control accordingly.

In the case of the Internet, the connections are normally of the "best effort" type, i.e. these connections do everything possible to convey the information up to their destination but without guaranteeing a certain level of quality of service (QoS). Thus, in the context of VPN communications, the transport layer of the tunnel is subjected to high fluctuations in transmission capacity.

The passenger TCP streams of this tunnel conventionally perform an end-to-end congestion control, i.e. the two communications devices work together in the determining of the bit rate at which the data of the server device (also called sender device here below) must be sent to the client device (also called receiver device or sink device here below). Clearly, if the server device has wrong knowledge of the characteristics of the network, as in the case of a VPN for the transport section of the tunnel, it is likely to send too much data which will then be delayed or even lost in the tunnel.

PEP mechanisms can be set up in order to influence the congestion control for passenger TCP streams from the tunnel in accordance with the intrinsic limitations of this tunnel at a given point in time. Thus, these TPP mechanisms are applied chiefly to congestion control and to the problems of retransmission on the different network segments taken by a TCP type connection.

However, when there is an increase in the available bandwidth (i.e. in the available resources) on one of the segments, there is no solution to take advantage almost instantaneously of this available bandwidth. At the very most, the PEP systems based on temporary storage or buffering of packets can send the data stored in their cache memory more swiftly but this has an effect that is limited in time.

This is especially true in the context of TCP connections transported via a VPN tunnel of the Internet. Indeed, a well known phenomenon of the TCP protocol in the stabilization phase lies in the fact that the increasing of its transmission window (the maximum number of packets allowed to exist simultaneously in transit between a sender device and a receiver device) depends on the reception of acknowledgements of previous packets, i.e. the TCP protocol sends one packet more per round trip time (RTT) or loop time. Since the RTT on an Internet tunnel is very high (10 times or 100 times that of a LAN), it is clear that a TCP stream cannot react as swiftly to an increase in the available bandwidth on an Internet connection.

Furthermore, in a VPN tunnel grouping together numerous passenger streams, it becomes really frustrating to be unable to make use of the bandwidth left free by a passenger stream that has just come to its end.

2. TECHNOLOGICAL BACKGROUND

The TCP protocol, designed for a cooperative purpose, suffers from several vulnerabilities that can be exploited by unscrupulous clients in order to obtain a service better than that of other network clients or to make "denial of service" type attacks.

Among the methods enabling greater allocation of the sending throughput rate of a server, we can single out the known mechanisms of acknowledgement splitting (ACK splitting) and optimistic acknowledgement (optimistic ACK).

In the ACK splitting or acknowledgment splitting mechanism, when the client receives a data segment containing N bytes he replaces the acknowledgement that should correspond to the received segment with a set of M distinct acknowledgments (M$\leq$N), each of the acknowledgements covering a portion of the received data segment.

By way of an illustration, we may cite the U.S. patent application 2006/0182025 ("TCP congestion control using multiple TCP ACKs") which uses a technique of this kind in a combined wire-based and wireless environment in order to limit the effect of losses on the wireless section resulting in a limitation of the bit rate of the server which considers the losses to be a sign of a congestion of the network. This patent application describes a mobile client with a modified protocol layer enabling the generation of numerous acknowledgements instead of only one, at the detection of a retransmission of the server and within the limits of the reception capacities proper to the client.

This acknowledgement splitting mechanism however can be likened to an attack by the server. To ward off such attacks, mechanisms have been set up by the servers available in the market, which annihilate the effect sought by the solution described in this patent application: the first anti-attack solution (known as byte counting) consists in increasing the congestion window only proportionally to the portion of acknowledged data, the effect of which is to nullify the acknowledgement splitting principle. A second anti-attack solution which is simpler consists in increasing the value of the congestion window by one MSS (maximum segment size) at each valid acknowledgement (in correspondence with the transmitted data segment). This last-mentioned method is implemented for example in recent versions of the Linux core.

The optimistic acknowledgement mechanism (optimistic ACK), relies on the fact that the TCP protocol is based on the principle in which the time between the sending of a data segment and the reception of its acknowledgement corresponds to at least one RTT (round-trip time). Since the increase in the congestion window depends on the RTT (exponentially during the slow-start phase and linearly during the congestion-avoidance phase), the smaller the RTT the faster will be the transfers. Thus, it is possible for a client to simulate a shorter RTT time in sending acknowledgements by anticipation for data that has not yet been received by him (or even not yet been sent by the server). However, if an acknowledgement such as this arrives for a piece of data that has not yet been sent, this acknowledgement is generally ignored by the server.

The danger of this mechanism is that it spoils the principle of end-to-end reliability of the connection between the server and the client. This mechanism too is therefore likened to an attack which can be averted by simple and known precautions: if the TCP server randomly varies the size of the segments sent (in the region of a value equal to [MSS—a few bytes]), a TCP client can no longer anticipate the acknowledgement terminals for data not yet sent and the TCP server can easily reject the optimistic acknowledgements.

The U.S. patent application 2005/0060426 ("Early generation of acknowledgements for flow control") presents a particular version of the optimistic acknowledgement mechanism (optimistic ACK).

This patent application presents a stream control module (such as a PEP or performance enhanced proxy module) located between the server and the client which anticipates the sending of TCP data segment acknowledgments once these data segments have been received by the stream control module. These segments are temporarily stored until reception of the real acknowledgement from the client, thus enabling retransmission in the event of error.

When the stream control module is used in a VPN gateway, it enables an automatic control link to be set up between the sending throughput rate of the server and the mean throughput of the WAN (wide area network) section and maintains a buffer storage on the gateway (in the event of a need to make retransmission on the WAN section in a manner that is entirely transparent for the server). Furthermore, when the buffer storage memory becomes full, a modification of the TCP window in the acknowledgment message is made in correlation with the available memory (this has the effect of diminishing the throughput rate of the server without lowering its congestion window.

In conclusion, the technique presented in the U.S. patent application 2005/0060426 is not capable of swiftly increasing the bandwidth consumed by TCP streams as described in the problem of the present invention (unexpected and major release of WAN bandwidth assigned to the passenger TCP streams of the tunnel). The prior-art PEP systems with optimistic acknowledgement require corresponding memory resources (because they are set up continuously) and modify the normal behavior of the TCP protocol according to the capacity of the buffer memory available.

In short, in their present modes of implementation, the above-mentioned prior-art mechanisms of acknowledgement splitting (ACK splitting) and optimistic acknowledgement (optimistic ACK) enable a greater allocation of the transmission bit rate of a server but are not low-cost solutions in terms of resources enabling the transmission bit rate of a server to be stimulated transparently for the server and the client (supporting the above-mentioned principles of TCP securization) while at the same time being adapted to the evolutive bandwidth in a network segment and more particularly in a VPN tunnel.

3. GOALS OF THE INVENTION

The invention in at least one of embodiment is aimed especially at overcoming these different drawbacks of the prior-art.

More specifically, it is a goal of the invention in at least one embodiment to provide a data packet transmission technique for the transmission of data packets through a segment of a communications network and the streams of these data packets complying with a transport protocol with acknowledgement, enabling optimum use of the bandwidth of this network segment (in taking advantage as rapidly as possible of any increase in bandwidth available in this network segment).

In at least one embodiment, the invention is aimed at dynamizing the data streams, conveyed according to a transport protocol with acknowledgement, such as the TCP protocol.

At least one embodiment of the invention is also aimed at providing a technique of this kind that is transparent to sender devices (servers) and receiver devices (clients) whose streams travel through the concerned network segment.

It is another goal of at least one embodiment of the invention to provide a technique of this kind that cannot be likened to an attack (computer piracy or hacking^), where the desired effect is not destroyed by current anti-attack solutions.

It is an additional aim of at least one embodiment of the invention to provide a technique of this kind that is compatible with end-to-end security.

It is an additional goal of at least one embodiment of the invention to provide a technique of this kind that is compatible with end-to-end reliability.

It is an additional goal of at least one embodiment of the invention to provide a technique of this kind that is simple to implement and costs little.

It is an additional goal of at least one embodiment of the invention to provide a technique of this kind that is set up dynamically and is limited in time in order to limit the consumption of processor resources and payload memory.

4. SUMMARY OF THE INVENTION

A particular embodiment of the invention proposes a method for the transmission of data of a data stream, called a stream to be stimulated, coming from a sender device and intended for a receiver device through a network segment included in a communications network and according to a protocol for packet transportation with acknowledgement, each packet being associated with a sequence number. Said method comprises the following steps implemented by an input device of said network segment for said stream to be stimulated:

determining a starting packet associated with a sequence number higher than the sequence numbers of packets, called packets in transit, transmitted by said input device via the network segment but for which the input device has not yet received a positive acknowledgement message coming from the receiver device;

selecting, as a function of a consumption of a target bandwidth for the transmission of said stream, packets of said stream following said starting packet, and for each of which an anticipated positive acknowledgement message must be transmitted to the sender device;

upon reception of a positive message of acknowledgement of said starting packet, coming from the receiver device, launching a temporary phase with a duration that depends on the number of selected packets, comprising a step of transmitting to the sender device an anticipated positive acknowledgement message for said starting packet and for each selected packet;

discarding the positive acknowledgements received from the receiver device which correspond to said selected packets and for which an anticipated positive acknowledgement message has been transmitted.

The general principle of the invention therefore consists of the selection, upon detection of available resources of the network segment, of one or more streams and the temporary acceleration of the throughput rate of the stream considered by means of an anticipated acknowledgement mechanism in setting a time-out on the launching of this temporary phase to prevent a sender device from receiving (anticipated) acknowledgements for packets when it has not yet received acknowledgements for the previous packets.

Thus, optimum use is made of the bandwidth of the network segment.

Furthermore, this technique is transparent to the sender devices (servers) and receiver devices (clients) whose streams have been selected. Indeed, it is entirely implemented by the input device (tunnel end-point in the case described here below in which the network segment is a tunnel) and relies on data packet formats compliant with the expectations of the sender devices (servers).

Advantageously, said step for the selection of packets following said starting packet comprises the following steps:

obtaining, as a function of said target bandwidth, a target value of transmission window size, which represents a maximum number of packets authorized to be simultaneously in transit between the sender device and the receiver device;

obtaining a current value of transmission window size, which represents a number of packets in transit between the sender device and the receiver device;

determining the number of selected packets necessary to enable an increase in said current value up to said target value of transmission window size.

Thus, for determining packets of said stream for which an anticipated acknowledgement message is transmitted by the input device, the technique of the invention takes account of the current transmission window size and adapts to current conditions of transmission via the network segment.

Advantageously, said temporary phase is interrupted in an anticipated way in the event of detection of a use by the sender device of at least one predetermined part of said target bandwidth.

Thus, once a given part (or a certain threshold) of the target bandwidth is reached for the stream, the input device stops the transmission of the anticipated acknowledgement messages in such a way that the sender device and the receiver device themselves stabilize the parameters (for a TCP stream: RTT, RTO, congestion window etc) of transmission of the stream until the target bandwidth is reached, in going through a congestion avoidance phase.

According to an advantageous characteristic, in the event of detection of a loss of one of said packets in transit, said method is reset by a return to said step of determining a starting packet.

Thus, upon detection of transmission error, the method redefines new parameters suited to accelerating the throughput rate of the stream by anticipated acknowledgement in the error situation encountered, the sender device retransmitting the missing packets and reducing its congestion window by half.

Advantageously, with a set of data streams going through the input device to access the network segment, the method preliminarily comprises a step of:

selecting at least one data stream from said set of data streams, each selected stream being a stream to be stimulated.

Thus, it is possible to select a stream to be stimulated from a set of data streams so as to optimize the use of the resources of the network or the use of the resources of the input device.

Advantageously, said step of selecting at least one data stream is based on at least one selection criterion belonging to the group comprising:

a stream of TCP type in the slow starting phase is rejected from the selection;

an encrypted stream is rejected from the selection;

a stream proposing a margin, greater than a predetermined threshold, for an increase in network resources consumed to transmit said stream is favored.

Thus, when a stream is a TCP stream (i.e. a stream whose transport protocol is the TCP) in slow-start phase, it is kept away from the selection because during this phase a stream has a major increase available for its congestion window unlike a stream in the congestion avoidance phase.

Furthermore, when a stream has at least one part that has undergone encryption (for example of the IPSec type for a TCP stream), it is kept away from the selection because being able to determine the value of certain fields of packets (of frames or segments) of the stream subsequent to encryption is an extremely complex matter.

Advantageously, the network segment being a tunnel between a first sub-network to which the sender device is connected and a second sub-network to which the receiver device is connected, said tunnel comprising a set of channels each associated with a transport protocol, the group of selection criteria furthermore comprises:

said target bandwidth resulting from a stopping of a stream transported via a given channel of the tunnel, another stream transported via said given channel is favored.

Thus, when the network segment considered is a tunnel having several channels available it is possible to simplify the design and implementation of the method in limiting the selection to the stream or streams transported via the same channel as a stream at the origin of a release of bandwidth on the tunnel.

Advantageously, in the event of detection of a loss of one of said packets in transit, said method is reset by return to the said selecting step for selecting at least one data stream.

Thus, upon a detection of transmission error, the method again selects a stream (which may be the same stream) for which the throughput rate is accelerated by anticipated acknowledgement, the sender device retransmitting the missing packets and reducing its congestion window by half.

According to an advantageous characteristic, said temporary phase comprises a step of reliably transmitting via the network segment the starting packet and each selected packet.

Thus, the method ensures that the selected packets (those for which an anticipated acknowledgement is transmitted to the sender device) will be accurately received by the receiver device and that the receiver device will effectively transmit positive acknowledgements for these packets.

Advantageously, said reliably transmitting step comprises at least one step belonging to the group comprising:

using a reliable transport mode via the network segment to transmit the starting packet and each selected packet;

increasing the priority level associated with the starting packet and with each selected packet;

storing the starting packet and each selected packet in order to be able to retransmit them in the event of a poor transmission via the network segment.

In a particular embodiment of the invention, the network segment being a tunnel between a first sub-network to which the sender device is connected and a second sub-network to which the receiver device is connected, said tunnel comprising a set of channels each associated with a transport protocol, said reliably transmitting step comprises a step of:

transmitting at least two copies, on at least two channels of said tunnel, of the starting packet and of each selected packet.

Thus, for an output device of the tunnel, it is possible to increase the probability of receiving at least one copy of the packet considered and thus ensuring that the output device of the tunnel can fulfill its function of a data relay to the receiver device.

In a particular embodiment of the invention, said method comprises the following steps:

receiving a positive acknowledgement message for said starting packet or for one of said selected packets, said received message comprising a piece of information sent by the receiver device to the sender device, said piece of information being a piece of protocol information encapsulated by said transport protocol with which said data stream is associated;

transmitting said piece of information in an acknowledgement message to be sent subsequently to the sender device.

This enables the conveyance of information on stream management up to the sender device although the anticipated acknowledgement mechanism is activated.

According to an advantageous characteristic, said piece of information sent by the receiver device is a command for the control of said data stream intended for said sender device.

Advantageously, said method comprises a step of managing the scheduling of the transmission of anticipated positive acknowledgement messages during said temporary phase, said managing step comprising the following step:

for the selected packets for which the sequence number is greater than or equal to a determined number which is a function of the sequence number of said starting packet and of an estimation of a number of said packets in transit between the sender device and the receiver device, transmitting the anticipated positive acknowledgement messages within a time limit that takes account of an estimation of a round-trip time between the sender device and the receiver device.

Thus, the scheduling of the packets can be used, in a first phase (packets whose sequence number is smaller than the predetermined number), for example to swiftly transmit anticipated acknowledgements so as to enable a swift increase in the congestion window associated with the stream. Thereafter, in a second phase, a time limit is insured between the packets so as to control (or master) the computation of the time before retransmission (retransmission timeout) applied by the server to the stream.

In another embodiment, the invention pertains to a computer program product downloadable from a communications network and/or recorded on a computer-readable carrier and/or executable by a processor. This computer program product comprises program code instructions for the implementation of the above-mentioned method, when said program is executed on a computer.

In another embodiment, the invention relates to a storage means that is possibly totally or partially detachable, readable by a computer, storing a set of instructions that can be executed by said computer to implement the above-mentioned method.

In a particular embodiment of the invention, there is proposed an input device of a network segment included in a communications method enabling the transmission of data of a data stream, called a stream to be stimulated, coming from a sender device and intended for a receiver device through said network segment and according to a protocol for packet transportation with acknowledgement, each packet being associated with a sequence number. Said input device comprises the following means for the processing of said stream to be stimulated:

determining means for determining a starting packet associated with a sequence number higher than the sequence numbers of packets, called packets in transit, transmitted by said input device via the network segment but for which the input device has not yet received a positive acknowledgement message coming from the receiver device;

first selecting means for selecting, as a function of a consumption of a target bandwidth for the transmission of said stream, of packets of said stream following said starting packet, and for each of which an anticipated positive acknowledgement message must be transmitted to the sender device;

transmitting means, activated upon reception of a positive message of acknowledgement of said starting packet coming from the receiver device, for transmitting to the sender device, during a temporary phase with a duration that depends on the number of selected packets, an anticipated positive acknowledgement message for said starting packet and for each selected packet;

discarding means for discarding the positive acknowledgements received from the receiver device which correspond to said selected packets and for which an anticipated positive acknowledgement message has been transmitted.

Advantageously, said first selecting means for selecting packets following said starting packet, comprise:

means for obtaining, as a function of said target bandwidth, a target value of transmission window size, which represents a maximum number of packets authorized to be simultaneously in transit between the sender device and the receiver device;

means for obtaining a current value of transmission window size, which represents number of packets in transit between the sender device and the receiver device, called a current value of transmission window size;

means for determining the number of selected packets necessary to enable an increase in said current value up to said target value of transmission window size.

Advantageously, said device comprises interrupting means for interrupting said temporary phase anticipatedly in the event of detection of a use by the sender device of at least one predetermined part of said target bandwidth.

According to an advantageous characteristic, said device comprises first resetting means, activated in the event of detection of a loss of one of said packets in transit, for resetting said means for determining a starting packet.

Advantageously, with a set of data streams going through the input device to access the network segment, the device comprises:

second selecting means for selecting at least one data stream from said set of data streams, each selected stream being a stream to be stimulated.

Advantageously, said second selecting means for selecting at least one data stream use at least one selection criterion belonging to the group comprising:

a stream of TCP type in the slow starting phase is rejected from the selection;

an encrypted stream is rejected from the selection;

a stream proposing a margin, greater than a predetermined threshold, for an increase in network resources consumed to transmit said stream is favored.

Advantageously, the network segment being a tunnel between a first sub-network to which the sender device is connected and a second sub-network to which the receiver device is connected, said tunnel comprising a set of channels each associated with a transport protocol, the group of selection criteria further comprises:

said target bandwidth resulting from a stopping of a stream transported via a given channel of the tunnel, another stream transported via said given channel is favored.

Advantageously, said device comprises second resetting means, activated in the event of detection of a loss of one of said packets in transit, for resetting said second means for selecting at least one data stream.

According to an advantageous characteristic, said device comprises reliably transmitting means, activated during said temporary phase, for reliably transmitting via the network segment the starting packet and each selected packet.

Advantageously, said reliably transmitting means comprise at least means belonging to the group comprising:

means for using a reliable transport mode of the network segment to transmit the starting packet and each selected packet;

means for increasing a priority level associated with the starting packet and with each selected packet;

means for storing the starting packet and of each selected packet in order to be able to retransmit them in the event of a poor transmission via the network segment.

In a particular embodiment of the invention, the network segment being a tunnel between a first sub-network to which the sender device is connected and a second sub-network to which the receiver device is connected, said tunnel comprising a set of channels each associated with a transport protocol, said reliably transmitting means comprise:

means for transmitting at least two copies, on at least two channels of said tunnel, of the starting packet and of each selected packet.

In a particular embodiment of the invention, the device comprises.

means for receiving a positive acknowledgement message for said starting packet or for one of said selected packets, said received message comprising a piece of information sent by the receiver device to the sender device, said piece of information being a piece of protocol information encapsulated by said transport protocol with which said data stream is associated;

means for transmitting said piece of information in an acknowledgement message to be sent subsequently to the sender device.

According to an advantageous characteristic, said piece of information sent by the receiver device is a command for the control of said data stream intended for said sender device.

Advantageously, said device comprises means for managing the scheduling of the transmission of anticipated positive acknowledgement messages during said temporary phase, said means for managing comprising the following means activated for the selected packets for which the sequence number is greater than or equal to a determined number which is a function of the sequence number of said starting packet and of an estimation of a number of said packets in transit between the sender device and the receiver device:

means for transmitting anticipated positive acknowledgement messages within a time limit that takes account of an estimation of a round-trip time between the sender device and the receiver device.

5. LIST OF FIGURES

Other features and advantages of embodiments of the invention shall appear from the following description, given by way of an indicative and non-exhaustive example (not all the embodiments of the invention are limited to the features and advantages of the embodiments described here below) and from the appended drawings, of which:

6. DETAILED DESCRIPTION

In all the figures of the present document, the identical elements and steps are designated by a same numerical reference.

Figure 1:
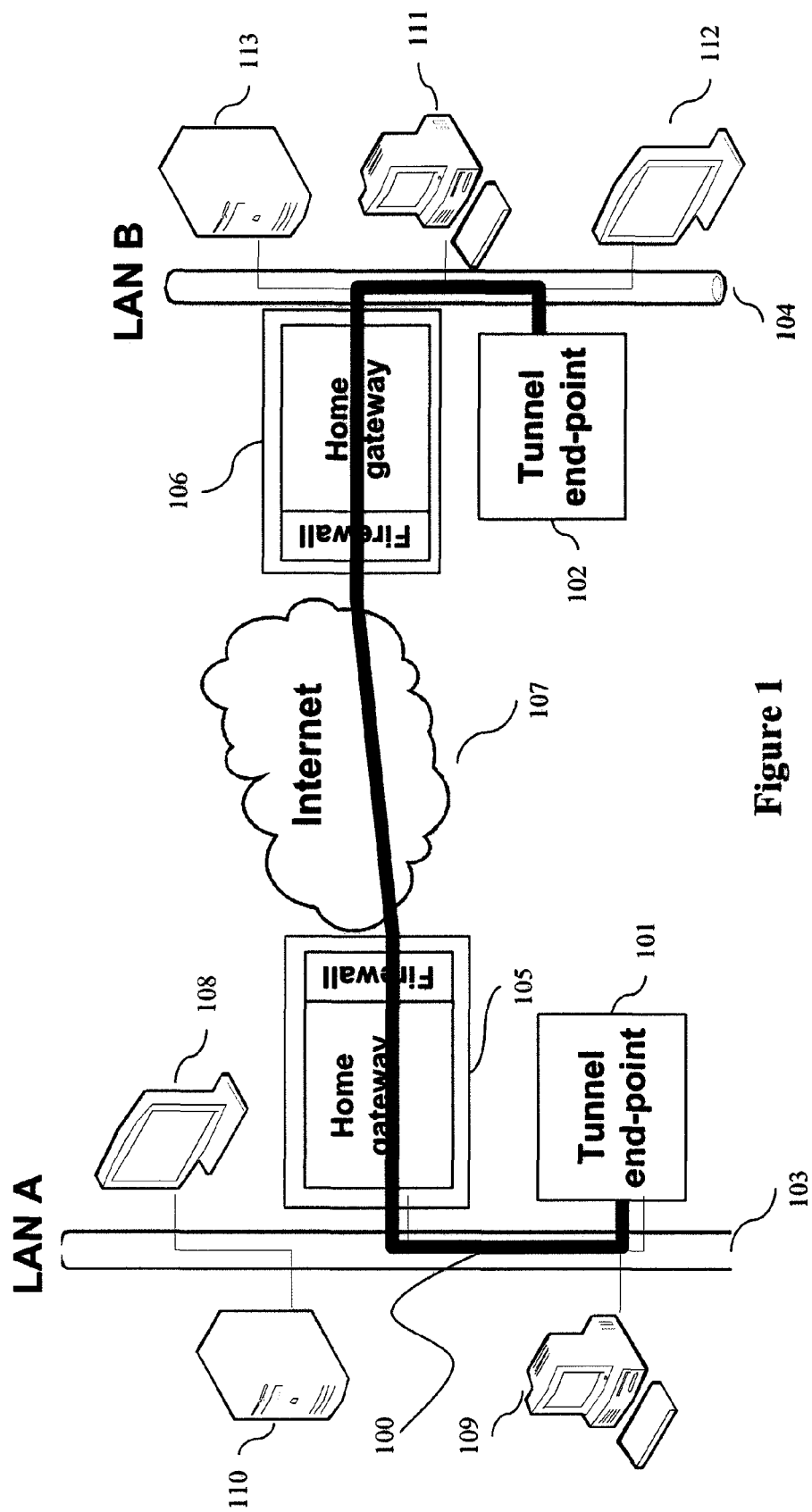
FIG. 1 illustrates a typical virtual private network (VPN) configuration using a tunnel.

FIG. 1 illustrates a typical configuration of a virtual private network (VPN) implementing a tunnel 100 between a local tunnel end-point 101 and a remote tunnel end-point 102, through a communications network 107 (the Internet for example). This tunnel 100 connects two local networks: LAN A 103 and LAN B 104. Each of the LANs 103 and 104 has a high-bit-rate Internet access apparatus (a home gateway capable of integrating a firewall) 105 and 106, PC type apparatuses 109 and 111, servers 110 and 113 for the storage and distribution of the digital media (of the audio, video and photo type) as well as digital media restitution apparatuses 108 and 112. A tunnel end-point may be integrated into an audiovisual apparatus such as a digital television set. It can also be presented in a PC type apparatus in the form of a program performing the functions associated with it.

Once the tunnel 100 is set up, the apparatuses 108, 109, and 110, connected to the LAN A 103, are capable of communicating with the apparatuses 111, 112 and 113, connected to the LAN B 104. For example, the customer 108 connected to the LAN A 103 can communicate with the server 113 connected to the network LAN B 104.

This FIG. 1 shows a simple communications network with only one tunnel, but it is understood that a same tunnel end-point may have to manage several tunnels (leading to an equivalent number of tunnel end-points) to interconnect a first LAN to several other LANs. Furthermore, for the sake of simplification, the figure does not show the infrastructure apparatuses in the Internet such as Internet routers.

Figure 2:
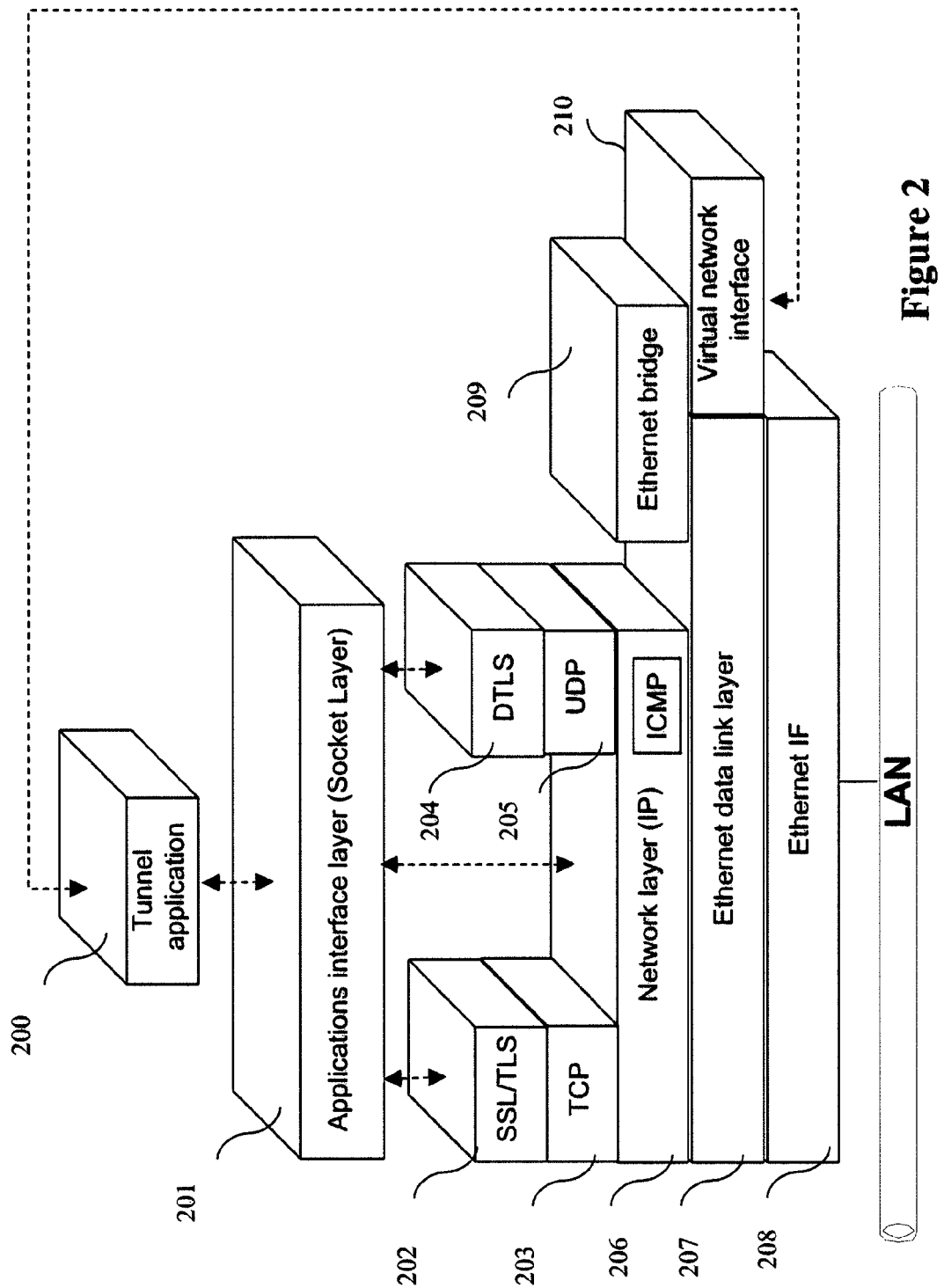
FIG. 2 is an example of a classic layered model of a tunnel end-point in which the method of the invention can be implemented.

Referring to FIG. 2, we shall now describe the routing of an Ethernet frame that comes from one of the apparatuses 108, 109, 110 (connected to the LAN B 103) and will enter the tunnel 100. To this end, a layered model will be used. This layered model describes the protocol layers needed for the implementation of this tunnel 100. In this model, the protocol elements necessary for functions other than the use of the tunnel are not represented. For example, the protocol elements associated with an UPnP architecture, when a tunnel end-point 101 is integrated into a UPnP apparatus, are not shown.

The tunnel end-point 101 has a Ethernet physical interface 208 which hands over the Ethernet frames coming from one the apparatuses 108, 109, 110 to the link layer 207 for routing: this routing is done toward the network layer 206, for the Ethernet frames intended for the apparatus comprising the tunnel end-point or toward the bridge layer 209 for the other Ethernet frames. The bridge layer 209 carries out the classic operations of an Ethernet bridge such as the filtering of Ethernet frames and the relay of these frames to the appropriate Ethernet output port or ports. The bridge has an Ethernet interface 207 and at least one virtual interface 210, simulating an Ethernet controller, attached to it. A virtual interface 210 is created for each tunnel instantiated by the application 200 to which it gives the Ethernet frames that must travel in transit on the respectively instantiated tunnels. Generally, the protocol of encapsulation of the tunnel represented by the application 200 performs the operations necessary for implementing each tunnel, among them in particular configuration, filtering and encapsulation (formation of a tunnel packet) and the extraction of a frame.

The frames received from the virtual interface 210, after processing by the application 200, are handed over in the form of a packet through an applications interface or socket 201 to a reliable TCP transport protocol 203 or to an non-reliable UDP transport protocol 205, respectively secured by an SSL protocol 202 and a DTLS protocol 204.

The term "reliable transport mode" or "reliable transport protocol" means a transport mode or protocol for which the device that sends a frame or data packet obtains a piece of information on the issuing of the frame or data packet sent to a receiver device. The main characteristic of a mode of this kind is the assurance of delivery of the frame or piece of data and not any transfer latency between the sender device and the receiver device. Here below, the term "reliable channel" will be understood to mean a channel for the transportation of data of a tunnel between two sub-networks (also called local LANs) using a data transport protocol (this data itself can take the form of packets of frames according to a determined transport protocol).

After processing by a transport protocol to form the tunnel packet 250 (FIG. 3), this packet is passed on to the network layer 206. The IP datagram thus formed with the current packet can now be transmitted on the LAN through the link layer 207 and physical layer 208.

The reception of a frame coming from the tunnel 100 will follow a path in the tunnel end-point that is the reverse of the path presented here above.

Figure 3:
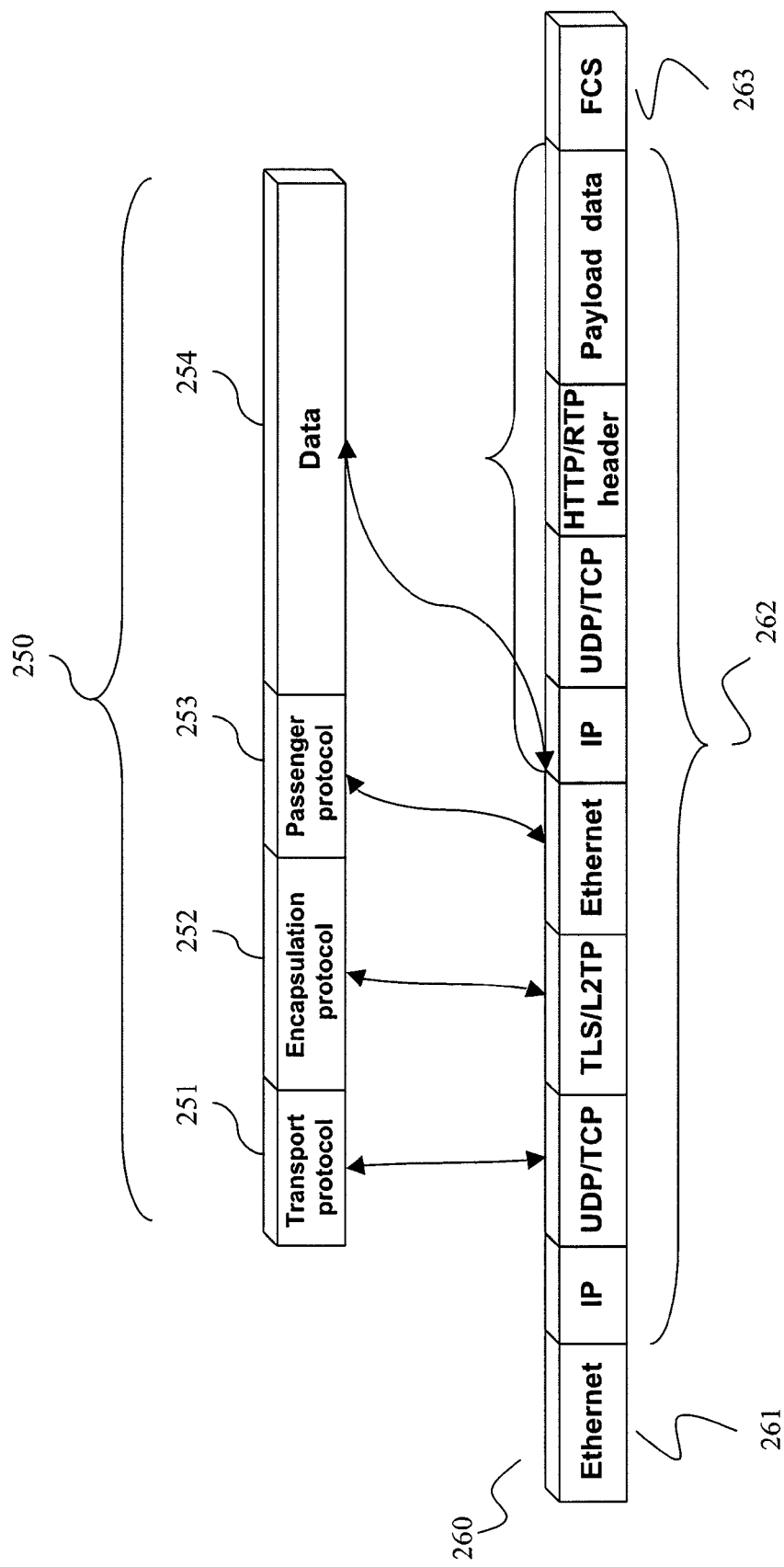
FIG. 3 is an example of a classic format of an Ethernet frame conveying a level 2 tunnel packet.

FIG. 3 shows an example of a classic format of an Ethernet frame (reference 260) in transit for example on the LAN A 103 of FIG. 1 comprising:
 an Ethernet header field (reference 261),
 a first IP datagram (reference 262) itself conveying level 2 tunnel packet (reference 250), and
 an FCS (Frame Check Sequence) field (reference 263).

The tunnel packet 250 has four parts:
 a transport protocol header field 251 (i.e. a TCP or UDP field in this example),
 a header field of the encapsulation protocol 252 (i.e. L2TP or TTLS in this example, described especially in the following documents "IETF RFC3931, "Layer two tunneling protocol—version 3 (L2TPv3)", J. Lau and all, Mar. 2005>> and <<IETF RFC2246, "The TLS Protocol Version 1.0">>),
 a header field of the passenger protocol 253 (namely Ethernet in this example), and finally
 a user data field 254 which itself comprises a second full IP datagram if no fragmentation has taken place in transit from the source apparatus.

Figure 4:
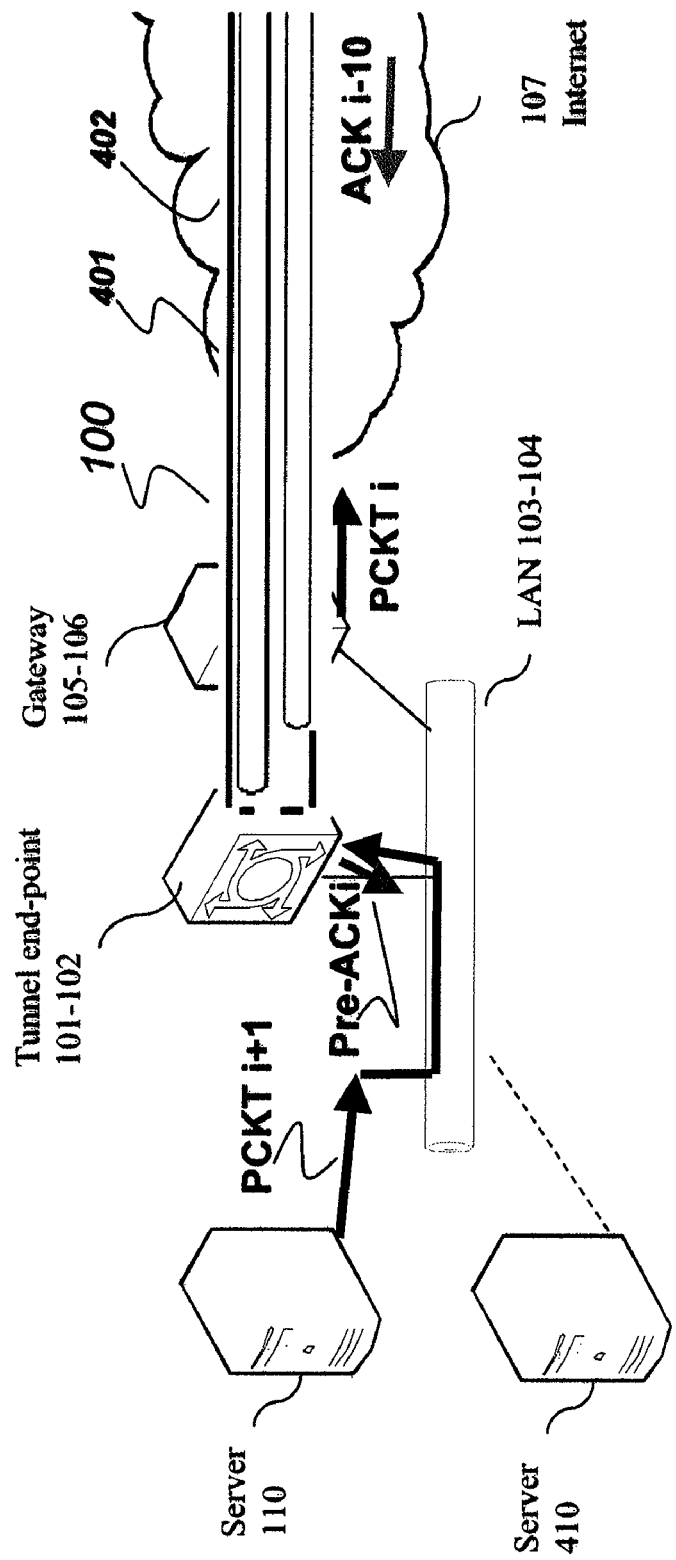
FIG. 4 is a schematic drawing of a scenario of application of an embodiment of the invention, with reference to the environment described in FIG. 1.

FIG. 4 provides a schematic view of a scenario of application of an embodiment of the invention with reference to the environment described in FIG. 1.

The tunnel end-point 101 (or 102) analyses the available bandwidth to send data in the tunnel 100, coming from the local area network 103 (or 104 respectively). This bandwidth may correspond to the sum of the characteristics proper to the different channels which equip the tunnel 100. The figure shows for example two channels in the tunnel 100 (TCP channel 401 and UDP channel 402) but the invention also addresses single-tunnel channels.

Thus, after detection of the stopping of a stream coming from the server 410 or else following an increase in the total WAN throughput rate available for the tunnel, the tunnel end-point assesses the bandwidth newly available on one of its channels or on all of its channels and chooses at least one passenger stream to which this bandwidth can be allocated. This chosen stream or these chosen streams are, in the direction of the tunnel end-point, streams to be stimulated with the sender device (server) so as to make the fastest possible use of the newly available bandwidth. Specific details concerning the possibilities of election will be given here below. For example, the TCP stream sent out by the server 110 is selected. In order to enable this selected stream to make faster use of the bandwidth, the tunnel end-point enters a temporary phase for the generation of anticipated acknowledgement messages for acknowledgement of segments of TCP data received from the server 110 through the tunnel end-point, it being known that these data segments will be transferred to the tunnel and therefore that the destination client has not yet received these data segments.

By way of an illustration, the TCP segments of the sequence numbers i and (i+1) (here below called segments i and segment (i+1) respectively, and referenced PCKTi and PCKTi+1 in FIG. 4) are sent out by the server 110. The segment i received by the tunnel end-point is swiftly acknowledged (pre-ACKi anticipated acknowledgement) by the tunnel end-point after having waited for all the already-transmitted packets via the network to have been truly received by the client (pending reception by the tunnel end-point of the acknowledgement of the packet having the sequence number i−1). The segment (i+1) will be acknowledged here below. It will be assumed that at this point the client has received only the segments up to the sequence number (i−10) and therefore that the last acknowledgement sent by the client (ACKi−10) is acknowledged for the packet having the sequence number i−10.

The generation of anticipated acknowledgements for the segments i and (i+1) will enable modification of the measurement of the RTT of the server 110 and therefore enable immediate sending of the following sequences (acceleration of the throughput rate of transmission of the server 110).

Here below a precise description will be given of a sequencing algorithm for the sending of the anticipated acknowledgement (pre-ACKi and following acknowledgments). The purpose of this algorithm is not avert excessive modification of the value calculated for a retransmission time-out or RTO by the server 110 so as not to reach the expiry of this RTO after the transmission of this last anticipated acknowledgement (end of the temporary transmission phase).

In a particular embodiment of the invention, it is deemed to be important to make reliable (or secure) the transportation of the pre-acknowledged TCP segments and the tunnel end-point will route these pre-acknowledged segments to a reliable channel (or more generally in using a reliable transport mode) of the tunnel 100 (for example a TCP channel 203 will be chosen even if the rest of the stream normally passes over the UDP channel 205). If the tunnel 100 does not have any reliable channel available, a buffer memory is activated on the tunnel end-point for said segments which, associated with a signaling protocol for the criticality of these segments, is used to give reliability to the transfer between the respective tunnel end-points (input tunnel 101 and output tunnel 102 end-points).

The temporary pre-acknowledgement phase ends after the sending of the last pre-acknowledgement packet (determined with reference to the steps 602 of the algorithm 6 explained here below). Furthermore, this temporary phase can also be terminated more quickly after it is detected that the server 110 has used the targeted or envisaged bandwidth (this is the case of a server with an increase in window that is more optimistic than the TCP standard) or a determined part of this bandwidth.

Figure 5:
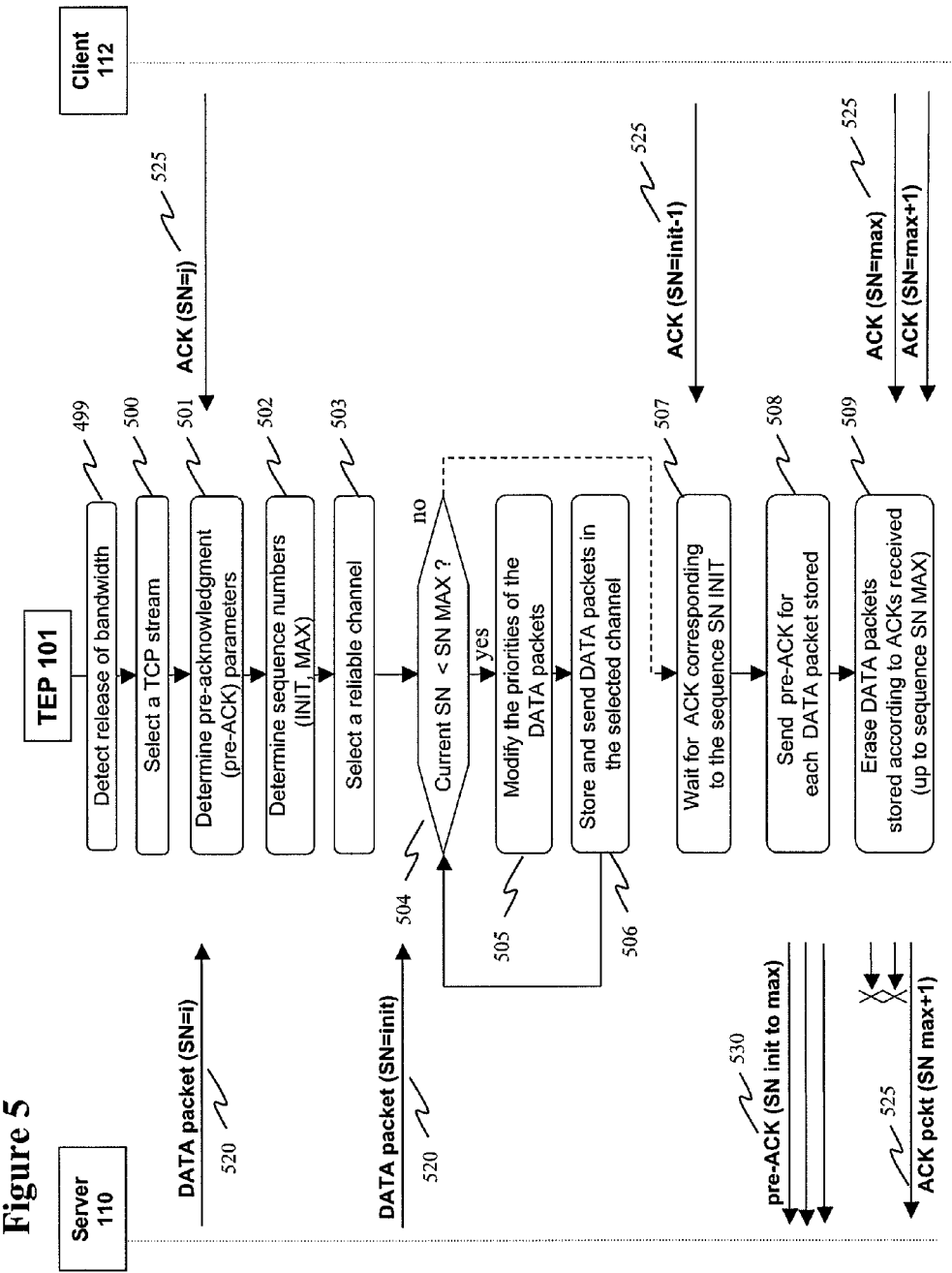
FIG. 5 is a flowchart of an algorithm executed by a tunnel end-point according to a particular embodiment of the method of the invention.

FIG. 5 is a flow chart of an algorithm executed by a tunnel end-point (TEP) 101 according to a particular embodiment of the method according to the invention. The description is again situated in the context of the environment described in FIG. 1 and considers the data segments (also called data packets) and acknowledgments (also called acknowledgment messages) exchanged while the TCP server-client connection (110 and 112 respectively) is active.

In a step 499, a release of bandwidth is detected in the tunnel. There are several ways of obtaining this information on available bandwidth. For example, a tunnel end-point obtains the characteristics of the connection interfaces (sockets) open for each channel of the tunnel (for example the use of the API Unix Socket Interface). Furthermore, a phase of monitoring the Internet connection enables the estimation of a mean bandwidth for access to the WAN and therefore provides knowledge at a given time of whether a reasonable margin is theoretically available. There is little risk in this case because even in the event of an error of appreciation, the buffers or buffer memories of transmission of each channel of the tunnel end-point enable compensation for it. This is why it is valuable to correlate an estimation of available bandwidth with a filling rate of the buffer memories of the connection interfaces or sockets of the channels of the tunnel.

The description is situated, by way of an example, in the context of a tunnel end-point 101 which manages the routing of the passenger TCP streams among the different channels of the tunnel 100, i.e. the tunnel end-point is capable of identifying the TCP streams at its input port which will travel through the tunnel. For example, it is reasonably possible to consider two types of TCP streams: TCP streams corresponding to major transfers (and especially lasting transfers) and control TCP streams (a few round-trip messages). Thus, only the first category of TCP streams is considered by the invention: this enables the allocation of bandwidth for the streams that can effectively benefit from them. Such streams can be detected for example by reception by the tunnel end-point of quality of service (QoS) queries such as queries related to UPnP QoS or SBM or any other QoS protocol active on one of the LANs or local area networks. Priority queries for streams provide knowledge on the nature of these streams: under the IEEE 801.1Q standard, the priorities 4 to 6 correspond respectively to continuously transmitted streams (i.e. transmitted by streaming), video transfer streams and audio transfer streams. These QoS queries carry all the references subsequently needed to identify the TCP stream (source and destination addresses, ports, protocol). It is clear that only the streams using transport protocols and equipped with acknowledgment such as the TCP are considered.

Furthermore, at the detection of the opening of a TCP connection (TCP segment with SYN flag, see Appendix), a more appropriate analysis of the applications protocols provides for knowledge of the characteristics of the transfer: for example a TCP stream carrying an HTTP applications protocol (253) contains information representing the type of media requested (HTTP GET message for a video with MIME TYPE "video/mpeg").

These examples are given as non-exhaustive examples.

In one particular embodiment of the invention, any other TCP stream not identified as specified here above is deemed to be conveyed in a distinct channel of the tunnel. This has the advantage of not disturbing the TCP streams that are passengers of the tunnel and to which the algorithm of the invention can be applied.

For the streams considered, the tunnel end-point 101 keeps the TCP sequence numbers of the data segments (also called packets) DATA and acknowledgment segments (also called packets or messages) ACK which pass through the tunnel end-point. This means that at any time the tunnel end-point knows the number of segments that have been sent on the tunnel but have not yet been acknowledged by the client (also called number of segments in transit or flightsize). Furthermore, the type of transmission phase (slow start) or congestion avoidance associated with each TCP stream is memorized. It is possible to determine the phase in which the stream is situated: through the sequence numbers and the counters cited above, the progress of the transmissions on a duration equal to two consecutive RTTs is measured. If there is a change of more than 1 in the number of packets, the operation is in the slow-start phase.

The step 499 of detecting an available bandwidth is followed by a step 500 of selecting a stream among those eligible as specified here above.

Several options are possible for the selection:
the TCP streams in slow start phase are rejected because of a greater increase in their congestion window in this phase, for which there is no a priori knowledge of the limit (SSTHRESH for steady-state threshold);
the TCP streams having an IPSec type encryption are also rejected because it is impossible to carry out surveillance on the parts of the segments (sequence numbers) altered by the encrypting;
preferably, a TCP stream having low windowing (inequality of the competing streams) is chosen. The value of the acknowledgment window (advertised window) sent by a client (present in each of the TCP messages sent out by the client to the server) is used to know the streams proposing the greatest margin for the increase of the bit rate;
with a view to simplifying the management of the routing of the tunnel end-point, it is possible to limit the selection of the TCP streams to those transported via the channel that has released the bandwidth (when the newly available bandwidth results from the stopping of the transmission of a stream on the tunnel);
more simply, the priorities associated with the different streams (IEEE 801.1P standard) may be an additional criterion of selection.

Once one or more TCP streams have been selected, the running of the following steps (501 to 509) is done independently for each selected stream.

The step 501 consists in determining the number of anticipated acknowledgment packets to be sent, given knowledge of the window-increasing target (which itself depends on the available bandwidth detected at the step 49). The internal values of this step 501 are presented here below with reference to FIG. 6.

The step 502 consists in determining the sequence number (INIT) of the starting packet, from which the temporary phase of generation of anticipated acknowledgments starts and the sequence number (MAX) of the end packet for which this temporary phase ends. The last segment received by the tunnel end-point is taken into account to perform this step 502.

For example, the sequence number segment INIT will correspond to the first packet to be acknowledged by anticipation and is determined with reference to the last TCP segment DATA 520 received from the server 110 at this time. This determining is done in terms of counting packets arriving at the tunnel end-point or in terms of packet sequence. For example, if the packet 520 conveys data for a sequence number having a value i, the first packet 520 which will comprise the sequence number value (INIT=i+flightsize) will be the first packet to enter the anticipated acknowledgment phase, flightsize being the number of segments in transit, as defined here above. According to one variant, the number of packets separating that of the sequence number i from that of the sequence number INIT, with the MTU (Maximum Transmission Unit) of the TCP connection being known.

The last packet to be considered for the anticipated acknowledgment phase is identified in relation with the MAX sequence number (MAX=INIT+[number of packets computed at the step 501]×MTU).

At the step 503, a search is made for a reliable channel in the tunnel in order to convey the selected packets at the steps 501 and 502 (i.e. the packets from the starting packet to the end packet). If the reliable channel or channels are congested, the tunnel end-point could carry out a derouting of the packets that usually travel in transit on the chosen channel towards a non-reliable channel in order to give preference to making transportation on the tunnel reliable for the selected packets (i.e. those of sequence number INIT to MAX) of the TCP streams considered by the algorithm.

The test of the step 504 is used to detect the arrival of the selected packets (TCP DATA segments 520 whose sequence numbers are included between INIT and MAX), in order to carry out the actions of the steps 505 and 506 for these selected packets.

At the step 505, given their importance, the selected packets 520 should not be lost: this is why it is possible for example to modify the conventional priority of the packet in specifying a higher service class (TOS or type-of-service field of the IPv4 header) so that once the packet is carried to the other end of the tunnel, the remote LAN takes greater precautions for routing the packets up to the client 112. Furthermore, the packets carrying selected packets 520 can have a priority that is revised upward so that the Internet routers will give preference to their transportation.

In a preferred mode of the invention, a piece of information on the criticality of a packet is integrated into the transporter packet of the reliable channel so that this information is detected by the tunnel exit tunnel end-point 102. This information may be of a proprietary type (for example a header field of the particularized encapsulation protocol 252) or it can be supported by a precise service class (the highest priority value 7 when a video/audio/voice stream does not exceed level 6 in the IEEE 802.1P specifications). The tunnel end-point 102 will be capable of setting up securization by a PEP (Performance Enhanced Proxy) bufferization mechanism in compliance with the RFC 3135 standard for passenger stream packets thus designated.

In the step 506, the selected packets are stored temporarily in a buffer memory dedicated to this type of packet so that they can be retransmitted in the event of any loss. Again in this step 506, the selected packets 520 are conveyed in the tunnel on the selected carrier channel selected at the step 503. As an option, each selected packet is conveyed on several channels simultaneously when great disturbances are detected in the reliable channel (in order to prevent costly retransmission times on this channel). In addition to the storage of the selected packets, the date of their reception is also memorized in order to have a time base available for the generation of anticipated acknowledgments (pre-ACK) at the step 508 described here below. The temporary character of the storage and its limitation solely to packets to which the algorithm of the invention can be applied will be noted.

The step 507 of waiting for acknowledgment (ACK) of the sequence number packet INIT (starting packet) is used to limit the execution of the following steps 508 and 509 to the selected packets (whose sequence numbers are included between INIT and MAX). At the arrival of an acknowledgment corresponding to the sequence number (INIT−1×MTU), it is possible to carry out the anticipated dispatch of the acknowledgment for the following packets. It will be noted that this test is used to time-out the starting of the anticipated acknowledgment phase in order to maintain consistency in the acknowledgment transmission reports. Indeed, according to the TCP protocol, it is not logical to receive acknowledgments for packets of given sequence numbers while certain packets of preceding sequence numbers have not yet been received. Quite logically, an acknowledgment for a packet with a sequence number k should not take place if the packet with a sequence number k−1 has not yet been acknowledged: depending on the TCP standard, a client must re-send an acknowledgment with a sequence number (k−i−1) for any received segment whose sequence number is strictly greater than k in order to indicate the loss or at least the delay of delivery of the segment of sequence (k): thus, when the server receives several identical acknowledgments (number k−i−1), it interprets a possible loss during the transfer of the DATA packets to the client and reacts by halving its congestion window and retransmitting the packets that it thinks it has lost: this is quite the reverse of the behavior sought in the invention (fast increase in the congestion window of the TCP server)!

In the step 508, (positive) anticipated acknowledgment packets (pre-ACK) 530 are sent for the sequence numbers INIT to MAX, in setting a time-out between each sending operation, this time-out value having been predetermined in relation to the step 501 or at the time itself for packets DATA 520 that has not yet been received at the execution of the step 501. In the latter case, the step 508 determines the time-out value as described by the second computation done at the step 603 of FIG. 6. In any case, no acknowledgment is made for a packet (DATA segment) not yet received from the server (and therefore not yet stored in the buffer memory of the tunnel end-point).

At the step 509, at the reception of acknowledgments 525 (ACK) coming from the client 112 corresponding to the sequence numbers already acknowledged in an anticipated way (pre-acknowledged), these acknowledgments are analyzed.

On the one hand, the acknowledgment may be positive, and the corresponding TCP segment DATA segment is discarded from the buffer memory and the acknowledgment message ACK is destroyed (not sent on the LAN 103 because the server has already received an acknowledgment, in an anticipated way, for this sequence number during the step 508).

Or else, on the other hand, the acknowledgment is negative (three TCP DUP ACKS segments are received for a sequence number s=INIT), and the packet having the sequence number (s+1) is transferred on the reliable channel of the tunnel 100 to the client 112. The packet having the sequence number (s+1) in the temporary storage zone or buffer zone is not destroyed.

In the context of a positive acknowledgment ACK 525 received from the client, a preferred mode of the invention comprises an analysis of the "data" portion (referenced 254 in FIG. 3) of the acknowledgment message 525 in order to determine the presence or non-presence of any command for the management of the data stream sent to the server (for example the acknowledgment ACK 525 carries an HTTP header with a command PLAY or PAUSE).

More generally, this analysis is used to determine the presence in a positive acknowledgment ACK 525 received from the client of a piece of information on the protocol (for example a cookie) that is encapsulated by said transportation protocol by acknowledgment with which said data stream is associated.

In the event of positive determination, there is a step of non-filtering this acknowledgment message ACK to the server (two acknowledgment messages ACK, even de-sequenced have no influence) or else the extraction of these commands from the current acknowledgment message ACK or the re-insertion of these commands into the next acknowledgment message ACK to be sent to the server.

It is clear that any stopping of transmission (TCP SYN-FIN message detected, see Appendix) by the server 110 for a stream selected by the algorithm described in FIG. 5 automatically stops this algorithm.

Furthermore, an analysis is made as a background task (not shown in the diagram) of each acknowledgment segment ACK 525 received by the client 112 for sequence numbers i (starting the algorithm) to the sequence number INIT (start of transmission of anticipated acknowledgments to the server) to detect possible DUP ACKs: three identical messages 525 indicate a loss of packets in transit to the client which, since they are not yet stored by the tunnel end-point in the buffer memory, will put the server in fast-retransmit mode and fast-recovery mode according to the RFC 2581 standard. Since the server will retransmit the missing packets and reduce its congestion window by half, the algorithm is re-initialized (restarting at the step 501 with the new estimated value of the congestion window of the streams, and the sequence number of the packets (DATA segments) is the one conveyed by the DUP ACKs packets).

Figure 6:
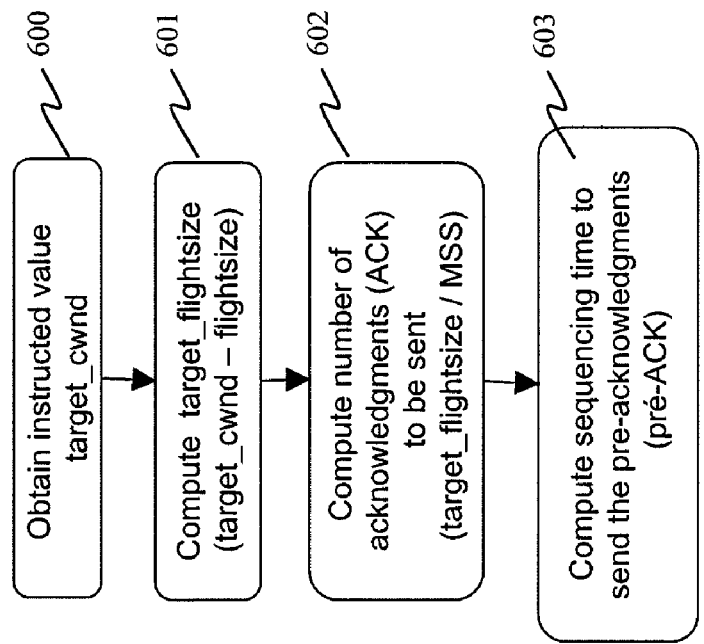
FIG. 6 is a flowchart of an algorithm used to determine parameters for the generation of anticipated acknowledgments according to a particular embodiment of the method of the invention.

FIG. 6 gives a schematic view of an example of an algorithm providing a detailed view of the step 501 for determining parameters for the generator of anticipated acknowledgments performed at the step 508.

The step 600 consists in obtaining the bandwidth target value proposed to the current TCP stream. This target value may be indicated equally as a bandwidth (BW) or as a window value (WD). We may recall the factor which links these two parameters: WD=RTT*BW. Here below, it is assumed that the bandwidth target value is expressed in the form of a congestion window target or target value ("target_cwnd").

In the step 601, the progression margin ("target_flightsize") is determined for the TCP stream. This value corresponds to the difference between the target value of the congestion window and a current value of a congested window, this current value being equal to the number (flightsize) of packets in transit between the customer and the server:

target_flightsize=target_cwnd−flightsize

In the step 602, from this margin, the number (N) of packets by which the congestion window can be increased to the target value is obtained. N=target_flightsize/MSS with MSS being the maximum size of the packet (segment).

It is the number N that will define the temporary side of the anticipated acknowledgment phase.

In the step 603, a time limit is computed for the transmission of the anticipated acknowledgments (pre-ACK 530) which will be used at the step 508.

According to the RFC 1122 and RFC 2988 standards, the value of RTO for a TCp connection is obtained from measured values of the RTT, thus:

$SRTT_{(i+1)} = (1-\alpha)*SRTT_{(i)} + \alpha*RTT_{(i)}$ where SRTT is a smoothed estimation of RTT, RTT is the last measured value of RTT and $\alpha = \frac{1}{8}$.

Based on this formula, an estimation of RTO is the following (according to the RFC 793 standard):

$RTO_{\omega} = \beta*SRTT_{(i)}$ where β is a factor of variance of the time limit (generally equal to 2).

Depending on the number of packets to be generated, the two distinct generation delays are determined so as to adapt the scheduling of the anticipated acknowledgments to the sequence number of the packets DATA to which they correspond.

Since the value flightsize giving an estimation of packets in transit on the tunnel for which the tunnel end-point has not yet received acknowledgment from the client, for all the packets having sequence numbers smaller than (flightsize/β), the anticipated acknowledgments can be transmitted immediately at entry into the step 508 (time-out=0). According to FIG. 5, these packets correspond to sequence numbers SN=INIT to SN=(INT+flightsize/P). Since the acknowledgment of the packet having a sequence number INIT (starting the generation of anticipated acknowledgments) is done after an RTT, according to the algorithm of FIG. 5, there is no reason to fall into a situation of going beyond the time-out of the server for the following packets designated here above.

For all the following packets (i.e. until the sequence number SN=MAX with reference to FIG. 5), a second computation of the time limit for the generation of the anticipated acknowledgment (pre-ACKs) takes account of the instant of reception of the segment DATA corresponding to the desired sequence. It may be recalled that this second computation is also typically set up during the execution of the step 508 for the packets DATA 520 not yet received in the execution of the step 501. The time limit for the generation of the anticipated acknowledgments (pre-ACKs) is computed as follows:

Time limit=$SRTT/\beta$−(current_time−reception_time)

where:

β is the factor of variance of the delay as defined according to the RFC 793 standard;
SRTT is a smoothed estimation of RTT;
"current_time" is the current instant;
"reception_time" is the instant of reception of the corresponding TCP packet DATA 520.

The difference (current_time−reception_time) represents the time elapsed since the reception of the TCP packet DATA 520. Taking account of this packet, makes it possible to send an anticipated acknowledgment as close as possible to the time limit SRTT/β after the reception of the TCP packet DATA 520 and thus without affecting the value of RTO.

Indeed, the borderline sequencing value (SRTT/β) guarantees a value of RTO for the TCP server that is always strictly below SRTT (there is therefore no problem during the stopping of the anticipated acknowledgments sending phase).

In a preferred embodiment, after the first anticipated acknowledgment has been sent, one in two packets to be concerned by the activation of the above-mentioned time-out: i.e. two acknowledgments (for two consecutive sequence numbers) could be generated consecutively (without the above-mentioned waiting time between these two acknowledgments). The smoothed formula for obtaining the SRTT tolerates a variation of RTT such as this (RTT close to 0 for one packet in two) without any impact on the computation of RTO.

Figure 7:
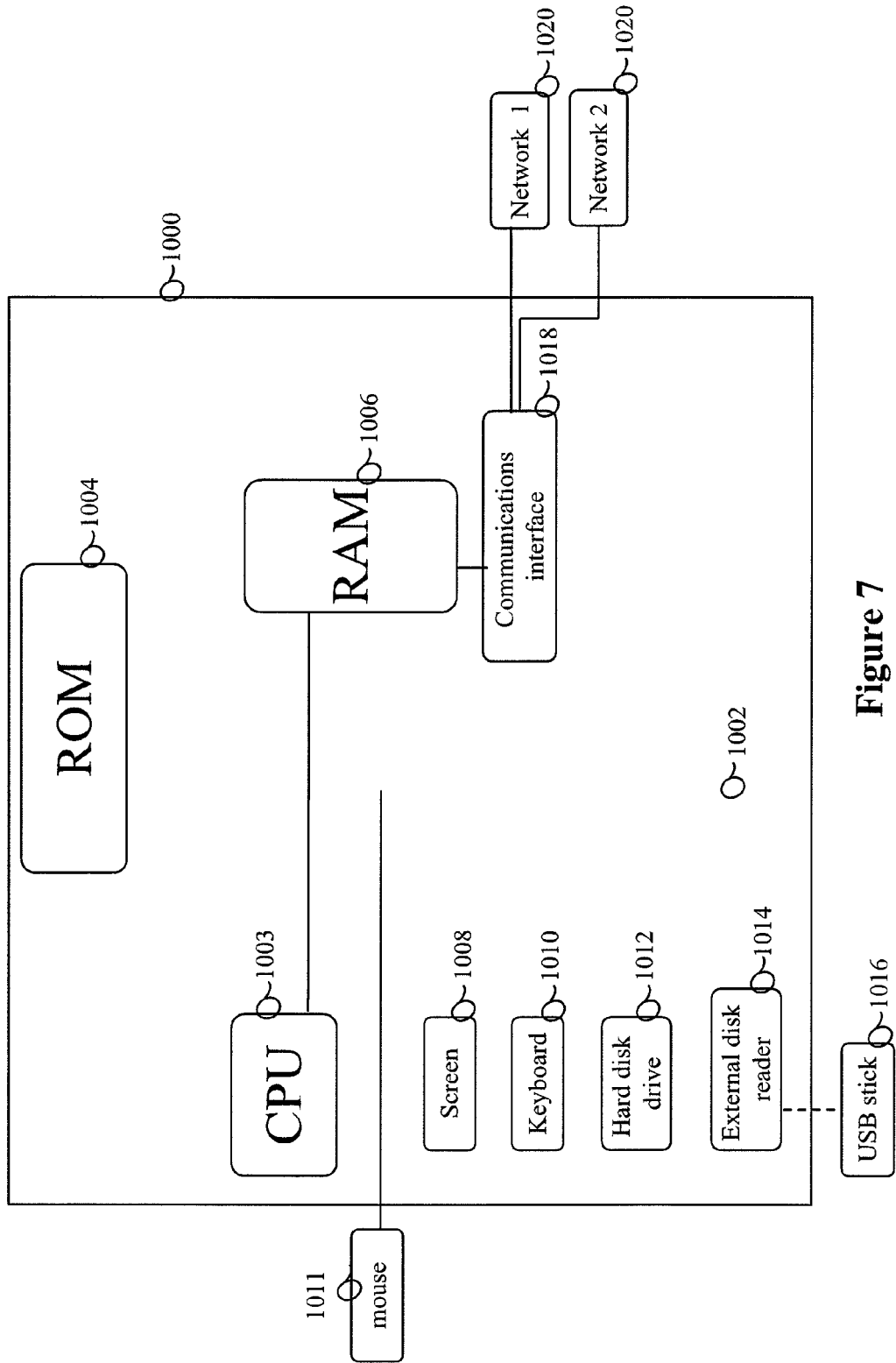
FIG. 7 shows the structure of a device (tunnel end-point) according to the particular embodiment of the invention.

FIG. 7 illustrates a schematic configuration of a generic communications device 1000 adapted to implementing a particular embodiment of the technique of the invention. For example, the tunnel end-point 101 or 102 mentioned here above with reference to FIG. 1 is identical to the generic device 1000.

This generic device 1000 may be connected in particular to any means for the storage of images, videos or sound connected to a graphic card and delivering multimedia information to the generic device 1000.

The generic device 1000 has a communications bus 1002 to which the following are connected:

a central processing unit 1003 (for example a microprocessor referenced CPU);

a read-only memory 1004 referenced ROM capable of comprising the above-mentioned software program or programs;

a random-access memory 1006 (cache memory referenced RAM) comprising registers adapted to recording variables and parameters created and modified in the course of execution by the above-mentioned software program or programs;

a communications interface 1018 linked to at least two distributed communications networks 1020, for example (in the case of FIG. 1) the LAN 103/104 and the Internet 107, the interface being capable of transmitting and receiving data with these networks.

The generic device 1000 also has (but this is optional):

a screen 1008 used to view the data and/or serve as a graphics interface with the network administrator who could interact with the programs according to the invention using a keyboard 1010 or any other means such as a pointing device, for example a mouse 1011 or an optical pencil;

a hard disk drive 1012 capable of comprising the above-mentioned programs;

an external disk drive 1014 enabling the reading of a USB memory stick.

The communications bus 1002 enables communications and interoperability between the different means included in the generic device 1000 or connected to this device. More generally, through the communications bus 1002, the central processing unit 1003 can communicate instructions to any device included in the generic device 1000 directly or by means of another generic device.

The executable code of each of program mentioned here above enabling the generic device 1000 to implement the method according to one embodiment of the invention can be stored in a non-volatile memory, for example the hard disk drive 1012, the read-only memory 1004 or the USB stick.

The central processing unit 1003 controls and directs the execution of the instructions or portions of software code of the program or programs according to one embodiment of the invention. When the equipment is powered on, the program or programs which are stored in the above-mentioned non-volatile memory (1012, 1004 or 1016) are transferred to the random-access memory 1006, which will then contain the executable code of the program or programs of the invention, as well as registers to memorize the variables and parameters needed to implement this embodiment of the method of the invention.

It must be noted that the communications apparatus comprising the device according to the invention can also be a programmed apparatus. This apparatus then contains the code of the computer program or programs, for example in a closed-end form in an applications specific integrated circuit (ASIC).

Appendix:Reminders Concerning the TCP Protocol

The TCP protocol (Transmission Control Protocol as defined by the RFC 793 standard) is an ARQ type protocol created in order to provide data transfer on the Internet according to a major criteria of speed and quality. At least two mechanisms are used to manage excess traffic arriving at a receiver: the first uses buffer reception memories and the second sets up a control of streams.

The TCP protocol is used to transfer data reliably although it uses the IP protocol which incorporates no control of data-gram delivery. Indeed, the TCP protocol has a reception acknowledgment system also called an acknowledge system or ACK used by the client (also called client device or receiver machine) and the server (also called server device or sender machine) to make sure of the efficient mutual reception of data. When a data segment (also called a data packet) is sent, an order number (or called a sequence number) is associated therewith. Upon reception of a data segment, the receiver machine will return a data segment whose flag ACK is at 1 (in order to report that this is an acknowledgment of reception) accompanied by an acknowledgment of reception number equal to the previous order number. Since the communications process, which is carried out by means of a data transmission and reception acknowledgment, is based on an order number (or sequence number) the sender and receiver (server and customer respectively) machines must know the initial order number of the other machine (called initial sequence number or ISN).

A TCP connection is set up in three stages:

in a first stage, the client sends a data segment comprising the SYN flag (or SYN message) to report that this is a synchronization segment with its initial sequence number (ISN=x);

in a second stage, the server receives the synchronization segment coming from the client then sends it an acknowledgment of reception, i.e. a data segment whose flag ACK is at 1 and whose flag SYN is at 1 comprising its own sequence number (ISN=y), but it must also acknowledge the previous packet, which it does with an acknowledgment of reception number that contains the initial order number of the client incremented by 1 (ack=x+1);

in a third stage, the client sends the server an acknowledgment of reception, i.e. a segment whose flag ACK is at 1, whose flag SYN is at 0 because it is no longer a synchronization segment. Its order number is incremented (seq=x+1) and the acknowledgment reception number represents the initial order number of the server incremented by 1 (ack=y+1).

Once this phase called a "three-way handshake" is completed, the two applications are capable of exchanging the bytes that warrant the setting up of the connection.

The stream control manages the allocation of resources, such as the memory and the process. at the level of the intended recipient In general, in compliance with stream control, the destination sets a limit on the transmission throughput rate implemented by all the sources that send data to the destination. The sources and the intended recipients coordinate the transfer of data through an exchange of messages comprising queries and acknowledgments of reception. Before the source starts sending packets, it sends a request to the destination aimed at obtaining permission to start transmission. In response to this query, the intended recipient sends a message comprising an identification of the number of packets that the source can transmit to the intended recipient without additional authorization. This number is commonly called "window size". Then, the source sends the number of authorized packets to the intended recipient and waits for the intended recipient to verify their reception. After the intended recipient has successfully received a packet, it sends a return message to the source comprising an acknowledgment of reception (acknowledgment) indicating that the packet has been received successfully and in certain cases permitting the source to send another packet. Thus, the number of packets in transit via the network (on the way from the source to the intended recipient) never exceeds the authorized window size.

Here below, different names for the TCP windows shall be noted:

TCP window: the initial value validated during the setting up of the connection, which is a maximum value permitted throughout the duration of the connection;

congestion window (CWND): the value of the current window sent from the server in a TCP packet addressed to the client;

acknowledgment window (acknowledge-window or advertise-window): the value of the window sent in an ACK TCP packet to the server which indicates the memory occupation in the client;

sliding window: the value of a window internal to a server enabling it to know the number of pieces of data to be transmitted since the arrival of the last acknowledgment TCP segment.

A large TCP window size encourages sending. If the number of pieces of data received is greater than what the window indicates, the out-of-window data are rejected. This loss leads to a large number of retransmissions and unnecessarily overburdens the network and the TCP. The use of a small size of window breaks up the throughput rate by adding a certain additional delay to the loop time or RTT but does so in limiting the excess load of the network due to retransmission. The opening of a very small window also reduces performance by increasing the weight of the headers relative to the data.

Even with the setting up of these mechanisms, in a busy network, several sources simultaneously send streams in the network to more than one destination. If too many such streams converge on a single router in a very short period of time, then the limited capacity in buffer memory of this router makes this volume of stream incapable of being processed, and this router will reject or destroy a part of the packet. When such a situation occurs, the network is said to be congested. When such a situation occurs, the transfers in the network get slowed down considerably and the throughput rate of the network drops. Since certain resources of the network are dedicated to the retransmission, when the network undergoes an overload, there is a substantial risk of occurrences of propagation of congestions and of the blocking of the entire network.

The value of the TCP MSS (Maximum Segment Size) field indicates the maximum quantity of TCP data per IP datagram that the local system can accept. When sent, the IP datagram can be broken up into several packets. In theory, this value can reach the value 65495, however a value of this size is never implemented. Typically, a terminal system uses the MTU interface (outgoing interface Maximum Transfer Unit) from which the value 40 is deducted as its TCP MSS field value. For example, a TCP MSS field value for the Ethernet protocol is 1460 (1500-40=1460).

The value of the TCP MSS field is entered into the packets serving to set up the connection which are the packets containing the signal SYN. Each side sends its own TCP MSS field value. It is not required that each side should use the same TCP MSS field value but each side cannot send more data than what is authorized by the remote station. The value of the TCP MSS field is sent at the maximum segment size (MSS) of the TCP header option.

It will be noted that the default value of the size of the buffer memory of the connection interface differs greatly as a function of implementation. The former implementations derived from Berkeley dictates default values of the TCP reception and sending buffer memories at 4 Kb, while the more recent system implements greater values (for example up to 64 Kb). For example, in Windows XP (registered mark), the current value of the window size at reception adjusts automatically according to pair increments of the maximum segment size (MSS) negotiated when the TCP connection was set up.

The TCP protocol uses several algorithms to manage its congestion, more particularly a slow start and a congestion avoidance algorithm. Each of these algorithms manages the sending throughput rate of the server by manipulating a congestion window (CWND) which restricts the number of unacknowledged bytes in transit at a given point in time. The possible TCP throughput rate for a given congestion window value is determined by the speed at which acknowledgments are received. The time taken to receive an acknowledgment after the sending of a piece of data is called TCP round-trip time (RTT).

When a connection is started up, the slow start algorithm is set up to rapidly increase the congestion window (CWND) in order to attain the value of the bandwidth as quickly as possible. The variable SSTHRESH (steady-state threshold) is maintained by the server in order to distinguish the two phases. When the sender concludes that there is a loss of a segment, it processes this information as an implicit signal of a network overload and rapidly decreases the congestion window. After having deduced the congestion threshold SSTHRESH approximately, TCP sets up the congestion avoidance algorithm which increases the value of the congestion window more slowly in order to occupy the additional available bandwidth.

During the slow start phase (when starting the connection or after the time-out has been exceeded), the starter starts with a CWND window setting operation of 1 MSS, and CWND increases by 1*MSS after each reception of a acknowledgment. The congestion window CWND is approximately doubled at each RTT (exponential growth). During the congestion avoidance phase (congestion-avoidance) the increase in CWND is limited to 1*MSS by RTT (additive growth).

A drop in performance is noted, in the Internet network where one can note a long propagation time. This prevents the transmission window from sending new segments rapidly (the acknowledgments determine the increase in the transmission window and the arrival after a long period of time).

The invention claimed is:

1. A method for transmitting data of a stream, the stream coming from a sender device and intended for a receiver device through an input device of a network segment included in a communications network and according to a packet transport protocol with acknowledgement, each packet being associated with a sequence number, wherein said method comprises the following steps implemented by the input device:

upon detection of an increase of bandwidth available on said network segment, determining a starting packet associated with a sequence number higher than the sequence numbers of packets in transit, where the packets in transit are packets transmitted by said input device via the network segment but for which the input device has not yet received a positive acknowledgement message coming from the receiver device;

selecting, as a function of a consumption of a target bandwidth for the transmission of said stream, packets of said stream following said starting packet;

temporarily storing selected packets received from the sender device, and transmitting to the sender device an anticipated positive acknowledgement message for each selected packet;

transmitting the selected packets to the receiver device via the network segment; and discarding stored selected packets corresponding to positive acknowledgements of transmitted selected packets, wherein the positive acknowledgments are received from the receiver device.

2. The method according to claim 1, wherein said step of selecting packets following said starting packet comprises the following steps:
obtaining, as a function of said target bandwidth, a target value of transmission window size, which represents a maximum number of packets authorized to be simultaneously in transit between the sender device and the receiver device;
obtaining a current value of transmission window size, which is a current number of packets in transit between the sender device and the receiver device; and
determining the number of selected packets necessary to enable an increase in said current value up to said target value of transmission window size.

3. The method according to claim 1, wherein said storing packets phase is interrupted in an anticipated way in the event of detection of a use by the sender device of at least one predetermined part of said target bandwidth.

4. The method according to claim 1, wherein, in the event of detection of a loss of one of said packets in transit, said method is reset by a return to said step for determining a starting packet.

5. The method according to claim 1, wherein, with a set of data streams going through the input device to access the network segment, the method preliminarily comprises a step of selecting at least one data stream from said set of data streams, each selected stream being a stream to be stimulated, and wherein said step of selecting at least one data stream is based on at least one selection criterion belonging to the group comprising:
a stream of TCP type in the slow starting phase is rejected from the selection;
a stream being encrypted is rejected from the selection; and
a stream proposing a margin, greater than a predetermined threshold, for an increase in network resources consumed to transmit said stream is favored.

6. The method according to claim 5, wherein, with the network segment being a tunnel between a first sub-network to which the sender device is connected and a second sub-network to which the receiver device is connected, said tunnel comprising a set of channels each associated with a transport protocol, the group of selection criteria further comprises:
with said target bandwidth resulting from a stopping of a stream transmitted via a given channel of the tunnel, another stream being transmitted via said given channel is favored.

7. The method according one to claim 5, wherein, in the event of detection of a loss of one of said packets in transit, said method is reset by return to said step for selecting at least one data stream.

8. The method according to claim 1, wherein said storing packets comprises a step of reliably transmitting via the network segment the starting packet and each selected packet and wherein said reliably transmitting step comprises at least one step belonging to the group comprising:
using a reliable transport mode of the network segment to transmit the starting packet and each selected packet;
increasing the priority level associated with the starting packet and with each selected packet; and
storing the starting packet and each selected packet in order to be able to retransmit them in the event of poor transmission via the network segment.

9. The method according one to claim 1, wherein said storing of selected packets comprises a step of reliably transmitting via the network segment the starting packet and each selected packet, and wherein the network segment being a tunnel between a first sub-network to which the sender device is connected and a second sub-network to which the receiver device is connected, said tunnel comprising a set of channels each associated with a transport protocol, said reliably transmitting step comprises a step of:
transmitting at least two copies, on at least two channels of said tunnel, of the starting packet and of each selected packet.

10. The method according to claim 1, wherein it comprises the following steps:
receiving a positive acknowledgement message for said starting packet or for one of said selected packets, said received message comprising a piece of information sent by the receiver device to the sender device, said piece of information being a piece of protocol information encapsulated by said transport protocol with which said data stream is associated; and
transmitting said piece of information in an acknowledgement message to be sent subsequently to the sender device.

11. The method according to claim 10, wherein said piece of information sent by the receiver device is a command for the control of said data stream intended for said sender device.

12. The method according to claim 1, wherein it comprises a step of managing the scheduling of transmission of anticipated positive acknowledgement messages during said storing of selected packets, said step of managing comprising the following step:
for the selected packets for which the sequence number is greater than or equal to a determined number which is a function of the sequence number of said starting packet and of an estimation of a number of said packets in transit between the sender device and the receiver device, transmitting the anticipated positive acknowledgement messages within a time limit that takes account of an estimation of a round-trip time between the sender device and the receiver device.

13. A non-transitory computer-readable storage medium, storing a computer program comprising a set of instructions executable by a computer in order to implement a method for transmitting data of a stream to be stimulated coming from a sender device and intended for a receiver device through an input device of a network segment included in a communications network and according to a packet transport protocol with acknowledgement, each packet being associated with a sequence number, wherein said method comprises the following steps implemented by the input device:
upon detection of an increase of bandwidth available on said network segment, determining a starting packet associated with a sequence number higher than the sequence numbers of packets in transit, where the packets in transit are packets transmitted by said input device via the network segment but for which the input device has not yet received a positive acknowledgement message coming from the receiver device;
selecting, as a function of a consumption of a target bandwidth for the transmission of said stream, packets of said stream following said starting packet;
temporarily storing selected packets received from the sender device, and transmitting to the sender device an anticipated positive acknowledgement message for each selected packet;

transmitting the selected packets to the receiver device via the network segment; and discarding stored selected packets corresponding to positive acknowledgements of transmitted selected packets, wherein the positive acknowledgments are received from the receiver device.

14. An input device of a network segment included in a communications method enabling the transmission of data of a stream coming from a sender device and intended for a receiver device through said network segment and according to a packet transport protocol with acknowledgement, each packet being associated with a sequence number, wherein said input device comprises:

determining means for, upon detection of an increase of bandwidth available on said network segment, determining a starting packet associated with a sequence number higher than the sequence numbers of packets in transit, wherein packets in transit are packets transmitted by said input device via the network segment but for which the input device has not yet received a positive acknowledgement message coming from the receiver device;

first selecting means for selecting, as a function of a consumption of a target bandwidth for the transmission of said stream, packets of said stream following said starting packet;

means for temporarily storing selected packets received from the sender device, and for transmitting to the sender device an anticipated positive acknowledgement message for each selected packet;

transmitting means for transmitting the selected packets to the receiver device via the network segment; and discarding means for discarding stored selected packets corresponding to positive acknowledgements of transmitted selected packets, wherein the positive acknowledgments are received from the receiver device.

15. The device according to claim 14, wherein said first selecting means for selecting packets following said starting packet, comprises:

means for obtaining, as a function of said target bandwidth, a target value of transmission window size, which represents a maximum number of packets authorized to be simultaneously in transit between the sender device and the receiver device;

means for obtaining a current value of transmission window size, which represents a number of packets in transit between the sender device and the receiver device, called a current value of transmission window size; and means for determining the number of packets, called selected packets, necessary to enable an increase in said current value up to said target value of transmission window size.

16. The device according to claim 14, further comprising interruption means, enabling the interruption of said storing packets in an anticipated way in the event of detection of a use by the sender device of at least one predetermined part of said target bandwidth.

17. The device according to claim 14, wherein, with a set of data streams going through the input device to access the network segment, the device comprises second selecting means for selecting at least one data stream from said set of data streams, each selected stream being a stream to be stimulated, and wherein said second selecting means for selecting at least one data stream, use at least one selection criterion belonging to the group comprising:

a stream of TCP type in the slow starting phase is rejected from the selection;

an encrypted stream is rejected from the selection; and a stream proposing a margin, greater than a predetermined threshold, for an increase in network resources consumed to transmit said stream is favored.

18. The device according to claim 17, the network segment being a tunnel between a first sub-network to which the sender device is connected and a second subnetwork to which the receiver device is connected, said tunnel comprising a set of channels each associated with a transport protocol, wherein the group of selection criteria furthermore comprises:

said target bandwidth resulting from a stopping of a stream transported via a given channel of the tunnel, another stream transported via said given channel is favored.

19. The device according to claim 14, wherein it comprises reliably transmitting means, activated during said storing of selected packets, for reliably transmitting via the network segment the starting packet and each selected packet, and wherein said reliable transmitting means comprises at least means belonging to the group comprising:

means for using a reliable transport mode of the network segment to transmit the starting packet and each selected packet;

means for increasing a priority level associated with the starting packet and with each selected packet; and means for storing the starting packet and each selected packet in order to be able to retransmit them in the event of poor transmission via the network segment.

20. The device according to claim 14, wherein it comprises reliably transmitting means, activated during said storing of selected packets, for reliably transmitting via the network segment the starting packet and each selected packet, and wherein, the network segment being a tunnel between a first subnetwork to which the sender device is connected and a second sub-network to which the receiver device is connected, said tunnel comprising a set of channels each associated with a transport protocol, said reliable transmitting means comprises:

means for transmitting at least two copies, on at least two channels of said tunnel, of the starting packet and of each selected packet.

* * * * *